BEST AVAILABLE COPY

T857024

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 10, 1968

857 O.G. 369

745,090

PIGMENT FLUSHING MEDIUM

Charles H. Coney, Kingsport, Tenn., and Willie E. Draper, Gate City, Va. (both % Tennessee Eastman Company, P.O. Box 511, Kingsport, Tenn. 37662)

Filed July 16, 1968. Published Dec. 10, 1968

Class 106—25

No Drawing. 3 Pages Specification

Sucrose acetate-isobutyrate is used to flush liquids from a wet pigment cake thus producing a fine particle size pigment dispersion.